A. J. SAVILLE.
DIRIGIBLE AUTOMOBILE LAMP BRACKET.
APPLICATION FILED MAY 10, 1912.
1,053,228.
Patented Feb. 18, 1913.
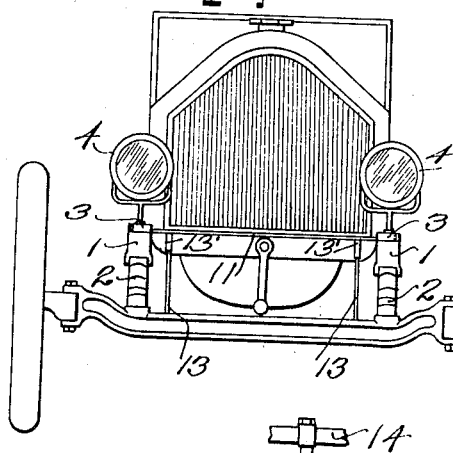
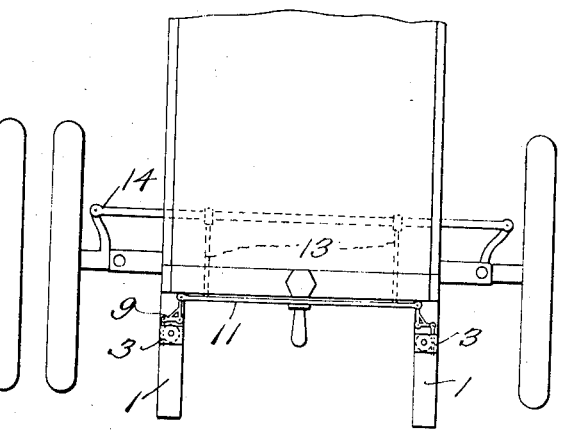
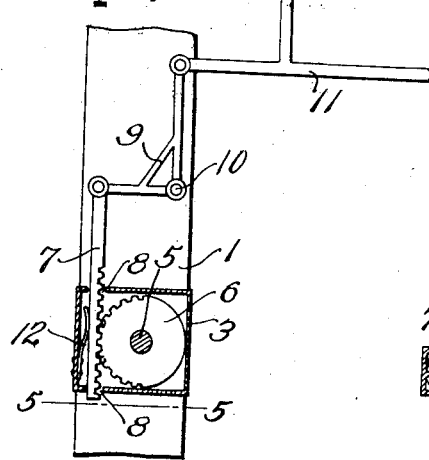
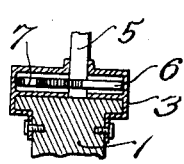
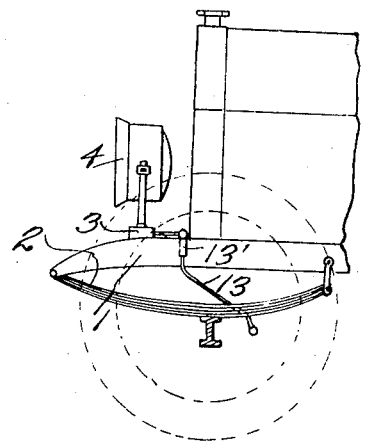
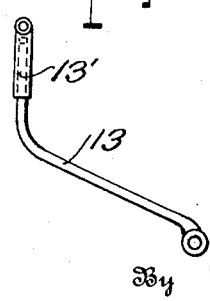
Witnesses
C. H. Wagner,
J. W. Kirkley
Inventor
Allen J. Saville
By Beeler & Robb
H. C. Robb
Attorneys

UNITED STATES PATENT OFFICE.

ALLEN J. SAVILLE, OF RICHMOND, VIRGINIA.

DIRIGIBLE AUTOMOBILE LAMP-BRACKET.

1,053,228.  Specification of Letters Patent.  Patented Feb. 18, 1913.

Application filed May 10, 1912. Serial No. 696,459.

*To all whom it may concern:*

Be it known that I, ALLEN J. SAVILLE, a citizen of the United States, residing at Richmond, in the county of Henrico and State of Virginia, have invented certain new and useful Improvements in Dirigible Automobile Lamp-Brackets, of which the following is a specification.

This invention appertains to improvements in dirigible automobile lamps, its object being to provide means for actuating the lamp standards through connection with the steering mechanism whereby the rays of the lamps may be turned in the direction or caused to follow the movement of the steering wheels, at all time lighting up the path of the vehicle in rounding curves.

It is further contemplated in carrying out my invention to provide a novel form of connection between the steering and lamp bars to accommodate for vibrations or resilient action of the vehicle.

My device is extremely simple and may be easily attached to automobiles of any standard make for performing the function hereinbefore mentioned.

For a full understanding of the present invention, reference is to be had to the following description and the accompanying drawings, in which—

Figure 1 is a front elevation of an automobile having my mechanism attached thereto; Fig. 2 is a top plan view thereof with the lamps omitted; Fig. 3 is an enlarged detail view, parts being broken away and in section to show more clearly my device; Fig. 4 is a vertical sectional view on the line 5—5 of Fig. 3; Fig. 5 is a side elevation showing more clearly the connecting arm between the lamp shifting and steering bars; and Fig. 6 is a detail view of the connecting arm alone.

Throughout the following detail description and on the several figures of the drawings, similar parts are referred to by like reference characters.

Referring to the drawings and specifically describing my invention, 1 designates the frame of an automobile supported at the front portion on the usual springs 2. At a suitable place on the frame 1 at each side of the automobile are provided casings 3, located beneath the lamps 4. Housed within the casings 3 and fixedly secured to the lamp standards 5 are horizontally disposed toothed sectors, or wheels, 6, meshing at one side with the longitudinally arranged rack bars 7 which extend through openings 8 at the front and rear portions of the casings 3. The rear extremities of the rack bars 7 are pivotally connected with one of the arms of the bell crank levers 9, which are in turn suitably pivoted to the frame 1 at 10 on each side of the automobile, the other of the arms of the levers 9 being pivotally connected to the extremities of the lamp shifting bar 11.

While under ordinary conditions the sides of the openings 8 in the casings 3 would guide the rack bars 7, I preferably provide leaf springs 12 secured to the inner walls of said casings, the free ends of which bear against said bars and hold them in mesh with the sectors 6, said springs, however, permitting longitudinal movement of the bars in operation of the device.

At suitable points at each side near the end portions of the lamp shifting bar 11 are located the connecting bars 13. The connecting arms are mounted upon the steering bar at their lower ends, extending forwardly and upwardly into the sleeves 13' depending from and formed integrally with the lamp shifting bar 11. The upper ends of the connecting arms extend into the sleeve 13' a suitable distance and permits of vertical movement in said sleeve to accommodate for vibration or resilient movement of the body of the vehicle on the springs 2. While I have illustrated in the drawings two of these connecting arms, it will be understood that one would suffice to perform the function equally as well.

The operative connection between the steering bar and pillar is of the usual type and it will be apparent from the foregoing description that the slightest movement of the steering bar through the levers 9 will move the rack bars 7 forwardly or rearwardly, turning the lamps simultaneously with and in the direction of travel of the steering wheels.

The casings 3 house the gearing in a neat manner and protect the same from dust.

Having thus described the invention, what is claimed as new is:

1. Lamp operating mechanism for vehicles comprising lamp standards, toothed sectors secured to said standards, longitudinally arranged rack bars intermeshing with said sectors, a lamp shifting bar, bell crank levers pivotally secured to the vehicle at opposite sides thereof and having one of their arms connected to the rack bars and the other of their arms connected with the extremities of the lamp shifting bar aforesaid, means operatively connecting the lamp shifting and steering bars, casings carried by the vehicle in which said sectors are housed and having openings through which the rack bars aforesaid pass, and springs secured to the walls of the casings to hold the rack bars in mesh with the sectors.

2. Lamp operating mechanism for vehicles comprising lamp standards, toothed sectors secured to said standards, longitudinally arranged rack bars intermeshing with the sectors, bell crank levers pivotally secured to the vehicle at opposite sides thereof, one of their arms being connected with the rear extremities of the rack bars, a lamp shifting bar connected at each end with the other arms of the bell crank levers and formed with depending integral sleeves, a steering bar for said vehicle, connecting arms secured to the steering bar and extending into the sleeves on the lamp shifting bars whereby the standards aforesaid will be actuated on movement of the said steering bar.

In testimony whereof I affix my signature in presence of two witnesses.

ALLEN J. SAVILLE.

Witnesses:
 WM. S. WOODSON,
 ALBERT T. AUGUST.